(12) United States Patent
Michel, Jr.

(10) Patent No.: US 9,120,499 B2
(45) Date of Patent: Sep. 1, 2015

(54) POWER ASSIST WHEELBARROW

(71) Applicant: Michel Sales Company, Inc., Minneapolis, MN (US)

(72) Inventor: Charles J. Michel, Jr., St. Paul, MN (US)

(73) Assignee: MICHEL SALES CO., INC., Minneapolis, MN (US)

( * ) Notice: Subject to any disclaimer, the term of this patent is extended or adjusted under 35 U.S.C. 154(b) by 0 days.

(21) Appl. No.: 14/183,334

(22) Filed: Feb. 18, 2014

(65) Prior Publication Data

US 2014/0231164 A1    Aug. 21, 2014

Related U.S. Application Data

(60) Provisional application No. 61/765,240, filed on Feb. 15, 2013.

(51) Int. Cl.
| | | |
|---|---|---|
| *B62D 51/04* | (2006.01) | |
| *B62B 1/18* | (2006.01) | |
| *B62B 5/00* | (2006.01) | |

(52) U.S. Cl.
CPC .............. *B62B 1/18* (2013.01); *B62B 5/0036* (2013.01)

(58) Field of Classification Search
USPC ............. 180/19.1–19.3, 65.1; 280/47.31
See application file for complete search history.

(56) References Cited

U.S. PATENT DOCUMENTS

| | | | |
|---|---|---|---|
| 1,965,409 A | | 7/1934 | Forrer |
| 2,253,288 A | | 8/1941 | Lucchi |
| 2,533,549 A | | 12/1950 | Bell |
| 2,588,503 A | * | 3/1952 | Dwyer ................ 280/47.22 |
| 3,791,470 A | | 2/1974 | Baddore et al. |
| 4,589,508 A | | 5/1986 | Hoover et al. |
| 5,149,116 A | * | 9/1992 | Donze et al. ........... 280/47.26 |
| 5,211,254 A | | 5/1993 | Harris, III et al. |

(Continued)

FOREIGN PATENT DOCUMENTS

WO    WO 2004/113148 A1    12/2004

OTHER PUBLICATIONS

International Search Report (Form PCT/ISA/210) for corresponding International Application No. PCT/US2014/016973 mailed on Jun. 3, 2014.

(Continued)

*Primary Examiner* — Tony Winner
(74) *Attorney, Agent, or Firm* — Billion & Armitage; Benjamin C. Armitage (57) ABSTRACT

Embodiments relate to a power assisted wheelbarrow. The wheelbarrow includes a dumping pan and a frame assembly in contact with the dumping pan. The frame assembly includes handles, a dump brace, one or more dumping pan supports and a resting support. The wheelbarrow also includes an electrical control assembly positioned in proximity to the handles, a wheel assembly including an axel positioned transversely between two wheels, an electrical motor assembly positioned in contact with the axel and in electrical contact with the electrical control assembly, a power supply supported by the frame assembly in electrical contact with the electrical control assembly and electrical motor assembly. Wherein the dump brace includes a curvature of about ninety degrees such that when a user dumps the contents of the dumping pan, the dump brace rolls into contact with the ground and prevents the dumping pan from contacting the ground.

17 Claims, 4 Drawing Sheets

(56) References Cited

U.S. PATENT DOCUMENTS

| | | | |
|---|---|---|---|
| 5,305,843 A | 4/1994 | Armstrong | |
| 5,350,030 A | 9/1994 | Mawhinney et al. | |
| 5,489,000 A | 2/1996 | Hillbohm | |
| 5,531,463 A | 7/1996 | Givens | |
| 5,884,924 A | 3/1999 | Fairchild et al. | |
| 6,065,555 A | 5/2000 | Yuki et al. | |
| 6,173,799 B1 * | 1/2001 | Miyazaki et al. | 180/19.3 |
| 6,474,007 B1 * | 11/2002 | Sueshige et al. | 37/266 |
| 6,554,301 B2 | 4/2003 | Scott et al. | |
| 6,745,859 B2 | 6/2004 | Simons et al. | |
| 6,820,880 B2 | 11/2004 | Benton et al. | |
| 7,354,059 B2 | 4/2008 | Black | |
| 7,775,306 B1 | 8/2010 | Adkins | |
| 8,235,153 B2 | 8/2012 | Robinson et al. | |
| 2007/0052187 A1 * | 3/2007 | Browder | 280/47.31 |
| 2007/0158922 A1 * | 7/2007 | Mullen et al. | 280/47.31 |
| 2012/0319370 A1 * | 12/2012 | Westphal | 280/47.31 |

OTHER PUBLICATIONS

Written Opinion (Form PCT/ISA/237) for corresponding International Application No. PCT/US2014/016973 mailed on Jun. 3, 2014.

* cited by examiner

POWER ASSIST WHEELBARROW

BACKGROUND

Current single tire and dual tire manual wheelbarrows provide an excellent method of moving loads from one location to another. These manual wheel barrows provide an acceptable means of manually transporting materials or goods from one location by grasping the two handles and pushing or pulling the wheeled unit over the ground. Because of their configuration, the manual wheelbarrow provides for the individual to raise the handles and dump the loaded materials or goods when the intended destination is reached. They are versatile in that they allow the operator to move it and the load freely in a forward or reverse direction and allows the operator to freely turn in any degree of direction while motion or in a stationary position. The usefulness of wheelbarrows is well known to those involved in construction, gardening, and home improvement where loads are moved and transported form one place to another.

Current wheelbarrow designs consisting of a front dump brace, a wheel or set of wheels, aligned on a single axel located forward of the center of gravity of the tray or tub, a frame, and operating handles well to the rear of the tray provide a unique tool in that due to its design a relatively heavy load may be balanced and moved to a desired location. Single wheel designs are the most popular as they are the most economical, yet they require the most effort to operate in that not only does the operator need to power the movement of the unit but also needs to maintain the balance while moving it over rough terrain and up or down hills. Two wheel designs incorporate the same effort to move forward and reverse as the single wheel with the advantage of the need for balance being eliminated by two wheels located on either side of the tray centerline. Both designs provide for significant maneuverability.

Currently, there have been attempts to power or motorize wheelbarrows by using gasoline-powered or electric engines in order to propel the wheelbarrow and load carried in the wheelbarrow. However, such attempts to power wheelbarrows have resulted in little more than powered carts. The current versions and designs of powered wheelbarrows do not operate like the current manual wheelbarrows available in the market place. They do not provide for a wheelbarrow designs consisting of a front dump brace, a wheel or set of wheels, aligned on a single axel located forward of the center of gravity of the tray or tub, a frame, and operating handles well to the rear of the tray. Nor do they allow for the operator to lift the handles which results in raising the entire unit, frame, wheels, and tray to a vertical ninety-degree position and dump the loaded materials or goods when the intended destination is reached. Current attempts do not allow for the entire unit to be raised to a full vertical position to dump the load in a single motion. These units require that the tray or pan be raised manually, by itself, while the frame and drive system stay stationary on the ground A significant problem with a single wheel motorized wheelbarrow can be that the battery, motor and drive means must operate properly in a numerous and wide variety of orientations relative to the single wheel or the support surface engaged to the single wheel. This is true because the conventional operation of a wheelbarrow having only a single wheel allows for rotation of a frame about the rotation axis of the single wheel located proximate to the front end of the frame as the rear end of the frame is lifted to initiate travel of the wheelbarrow from a first location to a second location. This rotation of the frame about the axis of the single wheel locates the frame in various orientations relative to the support surface engaged with the single wheel. This manner of rotation of the frame about the axis of a single wheel is entirely unlike the operation of wheelbarrows having a plurality of wheels which do not allow a significant amount of rotation of the frame about one or more of the plurality of wheels. Additionally, as a wheelbarrow with a single wheel travels it can tilt from side to side to alter the direction of travel or may be laid on its side during use. Moreover, in order to transfer materials from the load carrier of a wheelbarrow having a single wheel, the frame may be rotated about axis of the single wheel to tilt the load carrier to disgorge the materials contained within the load carrier or the wheelbarrow may be completely overturned.

Conventional wheelbarrows have a dump brace placed forward of the wheels to assume the weight of the wheelbarrow support system as the unit is elevated for dumping. The weight of the load in the tub or dumping pan is transferred to the dump brace and then to the lip of the tub to empty the load from the tub. The front lip of the tub and the tub itself must be strong enough to support the weight of the transferring load and the wheelbarrow itself. An additional challenge is that the current traditional dump brace and front of the tub lip are too sharp and tend to cut the plastic membrane used in landscape beds. In addition, because the front lip of the tub is used in a weight-bearing role, it is grounded when dumping the load-making it near impossible to completely empty the tub in a 90 degree upright position. A conventional wheelbarrow, when dumped, uses the front lip of the tub as the dump fulcrum. The standard tub design is not strong enough to bear the added weight of the motor and drive system and power supply.

SUMMARY

Embodiments relate to a power assisted wheelbarrow. The wheelbarrow includes a dumping pan and a frame assembly in contact with the dumping pan. The frame assembly includes handles, a dump brace, one or more dumping pan supports and a resting support. The wheelbarrow also includes an electrical control assembly positioned in proximity to the handles, a wheel assembly including an axel positioned transversely between two wheels, an electrical motor assembly positioned in contact with the axel and in electrical contact with the electrical control assembly, a power supply supported by the frame assembly in electrical contact with the electrical control assembly and electrical motor assembly. Wherein the dump brace includes a curvature of about ninety degrees such that when a user dumps the contents of the dumping pan, the dump brace rolls into contact with the ground and prevents the dumping pan from contacting the ground.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more". In this document, the term "or" is used to refer to a nonexclusive or, such that "A, B or C" includes "A only", "B only", "C only", "A and B", "B and C", "A and C", and "A, B and C", unless otherwise indicated. The terms "above" and "below" are used to describe two different directions in relation to the center of a composite and the terms "upper" and "lower" may be used to describe two different surfaces of a composite. In the appended aspects or claims, the terms "first", "second" and "third", etc. are used merely as labels, and are not intended to impose numerical requirements on their objects.

Embodiments of the present invention describe a power assisted wheelbarrow to provide forward and reverse push while maintaining freewheeling turning ability while under power or stationary. In addition, the wheelbarrow of the present embodiments keeps the standard wheelbarrow ability to dump the load easily at the intended destination. Unlike power assisted wheelbarrows previously developed, the design and positioning of the motor, drive and power supply maintain a reasonable weight for an operator to handle and dump easily.

Embodiments of the current invention solve the problems of powering a conventional wheel barrow in the forward and reverse direction even while under heavy load. The present design of the drive system to fit between the two-wheel configuration is unique and allows the wheelbarrow to maintain the same or better balance than the current art. The position of the drive system between the wheels also reduces the moment of force required to manipulate the directional orientation of the wheelbarrow. The drive design with the motor weight forward of the axel and the battery case still in close proximity to the axel maintains the weight balance provided by the current art allowing the operator to easily lift the handles with a fully loaded tray. In some embodiments, during initial tilting of the wheelbarrow the position of the motor weight forward of the axel provides positive assistance in tilting the dump brace into contact with a work surface. Once the dump brace of the dumping pan has contacted the work surface, force required to tilt the wheelbarrow into one or more dumping positions is reduced because the motor weight is closer to the pivot point (i.e., the contact point between the dump brace and the work surface). Further, because the weight of the entire unit is on the wheels, it frees the unit for movement.

One of the challenges created by the added weight of the drive system and batteries was the unit could not be dumped as easily as the current art. Prior art non-powered wheelbarrows are easily dumped as the only significant weight to deal with is the material to be dumped. This weight is transferred to the ground as the current designs are tilted forward. The only weight to deal with in raising the unit to the required vertical position to unload is the weight of the wheels and axel. The addition of the weight of the drive system and batteries presents a new challenge as it adds significant weight to the task of lifting the unit to the required vertical position to unload.

Embodiments of the present invention solve this problem with the addition of a uniquely designed rolled dump brace on the front of the unit. The rolled dump brace can comprise one or a plurality of members extending outwardly from the wheelbarrow frame in a forward direction. The one or plurality of members being curved in a direction upward from the ground can connect at their ends for stability. The curved portion of the one or plurality of members forming the rolled dump brace can be adjacent the connection point with the wheelbarrow frame, or can occur subsequent a straight segment between the connection point and the curved portion.

In some embodiments, as the wheelbarrow is tilting forward via its wheels, a portion of the rolled dump brace contacts the work surface. As the wheelbarrow is tilted further forward, subsequent portions of the rolled dump brace contact the ground, until the wheelbarrow reaches one or more desired positions. The portion of the rolled dump brace first contacting the ground can depend on many factors such as the curvature of the rolled dump brace, the length of the rolled dump brace, and the diameter of the wheelbarrow wheels. This rolled brace transfers the additional weight of the drive system and batteries to a gradual burden and allows the operator to push the unit vertically with little effort so that it can be unloaded just like the current and known art in wheelbarrow design.

The rolled dump brace can be of one-piece construction with the wheelbarrow frame. The rolled dump brace can be detachable from the wheelbarrow frame. The rolled dump brace can be customizable a variety of purposes. For example, the length of the rolled dump brace can be modified based on the diameter of the wheels such that less or more tilting is required to make engage the rolled dump brace with a work surface. In some embodiments the thickness of the one or plurality of members can be adjusted so as to more favorably interact with a work surface. For example, a thicker one or plurality of members may be preferable for a work surface comprised of soft or shifty material such as gravel or fine sand.

In some embodiments the rolled dump brace comprises spike, extrusion, or claw useful for holding the rolled dump brace in contact with a work surface. In some other embodiments, the rolled dump brace comprises a plurality of spikes, extrusions, or claws, such that the rolled dump brace can grip or substantially frictionally engage a work surface during a tilting motion. Such features can be highly advantageous on inclined, declined, or slippery surfaces.

In some embodiments the curved portion of the rolled dump brace has a constant curvature. In other embodiments, the rolled dump brace has a non-constant curvature. For example, the curvature may be radius-increasing towards the end of the brace furthest from the wheel axel. A radius-increasing curvature is advantageous as it requires less force to roll the wheelbarrow weight across given length of the rolled dump brace earlier in a tilting motion, when gravity works hardest against the tilting motion, and requires increasing force to roll the wheelbarrow weight across given length of the rolled dump brace later in a tilting motion, when gravity decreasingly works against the tilting motion. Such a design is ergonomically beneficial to an operator as it requires a more consistent level of force to tilt the wheelbarrow, and additionally reduces the maximum force required for tilting throughout a tilting motion.

One of the disadvantages of the current art is that the tray is used as a fulcrum to transfer the position of the load to dump, inhibiting the full discharge of the loaded material. Additionally, the unit needs to be shaken from side to side, requiring additional effort by the operator. The additional advantage of the rolled dump brace is it gradually transfers the weight of the drive and batteries. Also, the rolled dump brace is positioned such that the front lip of the tray never engages the work surface, thereby allowing the tray to totally discharge all of the load without any additional effort from the operator. The rolled dump brace can also be utilized in a non-motorized cart or wheelbarrow.

One of the disadvantages of the current art is the dump brace or front lip of the dumping pan acts as a single contact point with the work surface while dumping a load. This concentrates the entire combined weight of the load and the wheelbarrow at a single point, and can cause the dump brace or dumping pan front lip to sink or lodge into the work surface. Additionally, adjusting the directional orientation of a wheelbarrow while the dump brace or front lip of the dumping pan is planted on a work surface can require a significant amount of force and strain on the operator, and will often disturb or destroy the work surface at the contact point. Damage to a work surface can be detrimental where work surface contour and topography is important, or where the work surface is aesthetically valued, such as a highly manicured lawn or garden, for example. It is similarly difficult to maneuver the wheelbarrow in a forward or backward direction while the dump brace or dumping pan front lip, or both, is planted.

Embodiments of the present invention solve this problem with the addition of a uniquely designed rolled dump brace on the front of the unit. This rolled brace transfers the combined weight of the load and the wheelbarrow across a number of points on the work surface, thereby preventing or reducing high pressure at a single point on the work surface. Additionally, in the event that the rolled brace fully or partially sinks or lodges into the work surface, the rolling interaction between the rolled brace and work surface during movement provides a continuous lever advantage such that the sunken or lodged portion of the rolled brace is more easily freed.

Further, the rolling dumping motion enables the operator to more easily adjust the directional orientation of a wheelbarrow having a rolled brace by simultaneously rolling the wheelbarrow along the rolled brace and applying a force transverse to the direction of the wheelbarrow. Because pressure on the work surface is spread throughout the rolled brace, damage to the work surface is reduced, minimized, or prevented. The transverse force may be applied to the handles by an operator. The transverse force may also be applied via the motor, either by driving one wheel in a forward or backward direction, or by driving one wheel in a forward direction and the other wheel in a backward direction.

Additionally, the rolled brace enables the wheelbarrow to be moved in a forward or backward direction while engaged with the work surface. In some embodiments the rolled brace acts as one or more sled runners, thereby reducing pressure per unit area on the work surface and allowing for easier movement by an operator and reducing, minimizing, or preventing damage to the work surface. Forward and backward movement while the rolled brace is engaged with a work surface may be accomplished manually by an operator while the wheels are disengaged from the work surface, or via the motor and wheels while the wheels are engaged with the work surface.

The motor and drive system fits substantially or directly between the wheels so as to not add any weight on either side of the axel that would affect the balance needed between the handles and the dump brace. If the weight is put too far forward of the axel it causes the unit to auto-dump as it is being loaded. If the weight is behind the axel, this results in too much added weight to make dumping easy for the average individual. The current embodiment uses an axel between the wheels or tires with a location between the handles and the dump brace that does not add weight when dumping the load, and provides a more centrally balanced apparatus which does not require fastidious, auto-dumping preventing loading procedures. The uniquely designed rolled dump brace transfers the weight gradually as the unit is pushed forward greatly reducing the impact of having to lift the additional weight of the motor, drive and power supply. The rolled dump brace lifts the tub off the ground for easy emptying.

Figure 1:
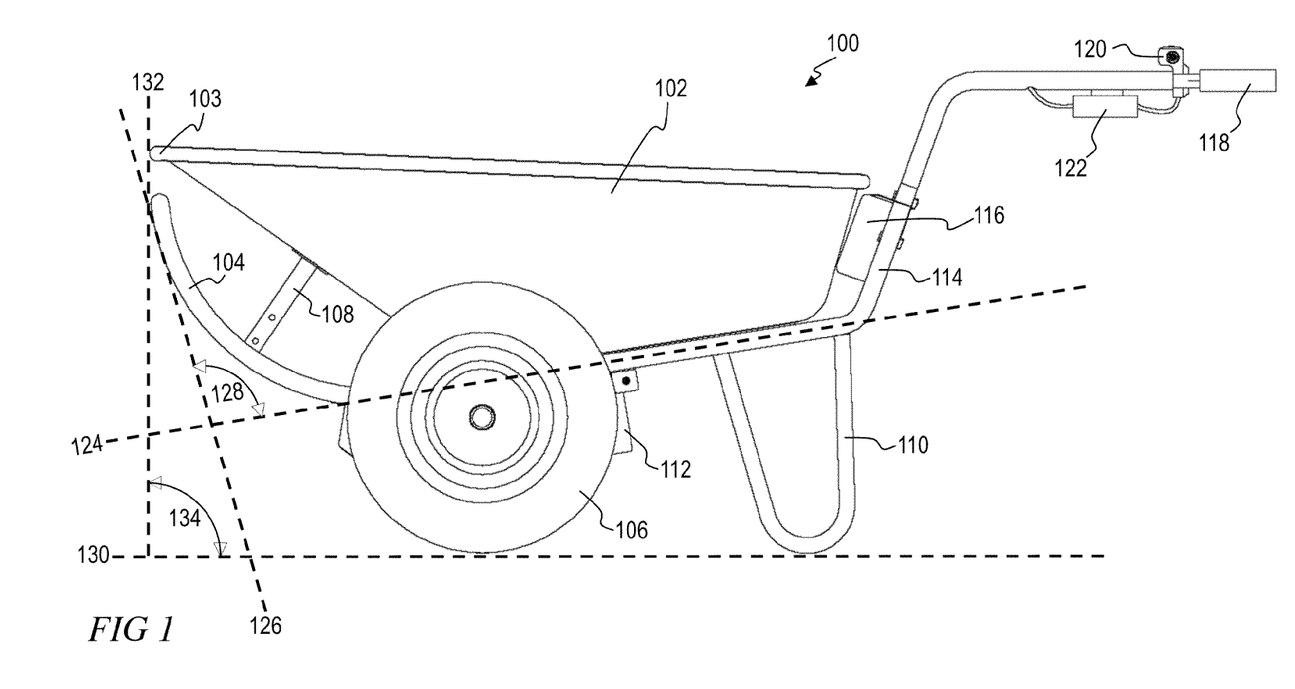
FIG. 1 is a side schematic view of a power assist wheelbarrow, according to some embodiments.

Referring to FIG. 1, a side schematic view 100 of a power assisted wheelbarrow is shown, according to some embodiments. A dumping pan 102 having a front lip 103 is supported by frame assembly 114. The frame assembly 114 includes handles 118, a dump brace 104, one or more dumping pan supports 108 and a resting support 110.

An electrical control assembly 122, 116 is positioned in proximity to the handles 118 and includes a control switch 120 to control speed and direction and on/off functions. A wheel assembly 106 including an axel positioned transversely between two wheels is partially shown. The wheelbarrow includes an electrical motor assembly (not shown in figure) positioned in contact with the axel and in electrical contact with the electrical control assembly 122 and a power supply 112 supported by the frame assembly 114 in electrical contact with the electrical control assembly and electrical motor assembly.

The dumping pan 102 can be manufactured of a metal, plastic or other synthetic material or wood, for example. The dumping pan 102 (or tub, tray, storage pan or bucket) is secured to the frame assembly 114 or integrated with the frame assembly 114. Securing may include fastening or welding. The dumping pan supports 108 are secured to or integrated with both the pan 102 and dumping brace 104. The pan 102 can be further secured to the frame assembly on an underside of the pan 102 to support plates 204, 212 (shown in FIG. 2).

The frame assembly 114 includes handles 118, a dump brace 104, one or more dumping pan supports 108 and a resting support 110. The handles 118 extend longitudinally towards a user and are positioned at a height from the ground and spacing for a user or operator to comfortably grip the frame assembly 114. Handles 118 may be parallel or be ergonomically angled. For example, handles 118 can form an angle of up to 16 degrees. The frame assembly 114 can be manufactured of steel, aluminum or durable plastic or polymers. In a two-wheel design, a resting support 110 contacts the ground when the wheelbarrow is not moving or being lifted by a user. The resting support 110 typically includes two supports, each positioned substantially in line with the outer plane of the pan 102 to support the weight of a load.

The dump brace 104 includes a curvature of about ninety degrees such that when a user dumps the contents of the dumping pan, the dump brace rolls into contact with the ground and prevents the dumping pan from contacting the ground. The dump brace angle can be more or less than ninety degrees in relation to the frame assembly, such that the brace 104 rolls into contact with the ground and substantially prevents the pan 102 from engaging the ground. The angle 128 of the brace in respect to the lower frame assembly plane 124 and brace vertical plane 126 can be about 70 to about 110 degrees, about 80 to about 100 degrees or about 85 to about 95 degrees. The angle 134 of the brace in respect to the ground horizontal plane 130 and ground vertical plane 132 can be greater than about 90 degrees, about 90 to about 110 degrees, about 95 to about 120 degrees or about 100 to about 135 degrees. The combination of the curvature with the length and angle of the brace 104 allows for a significantly easier dumping operation for a user and prevents damage to the ground or items coming into contact with the pan 102 in a dumped position (such as landscaping or weed paper, for example).

Figure 2:
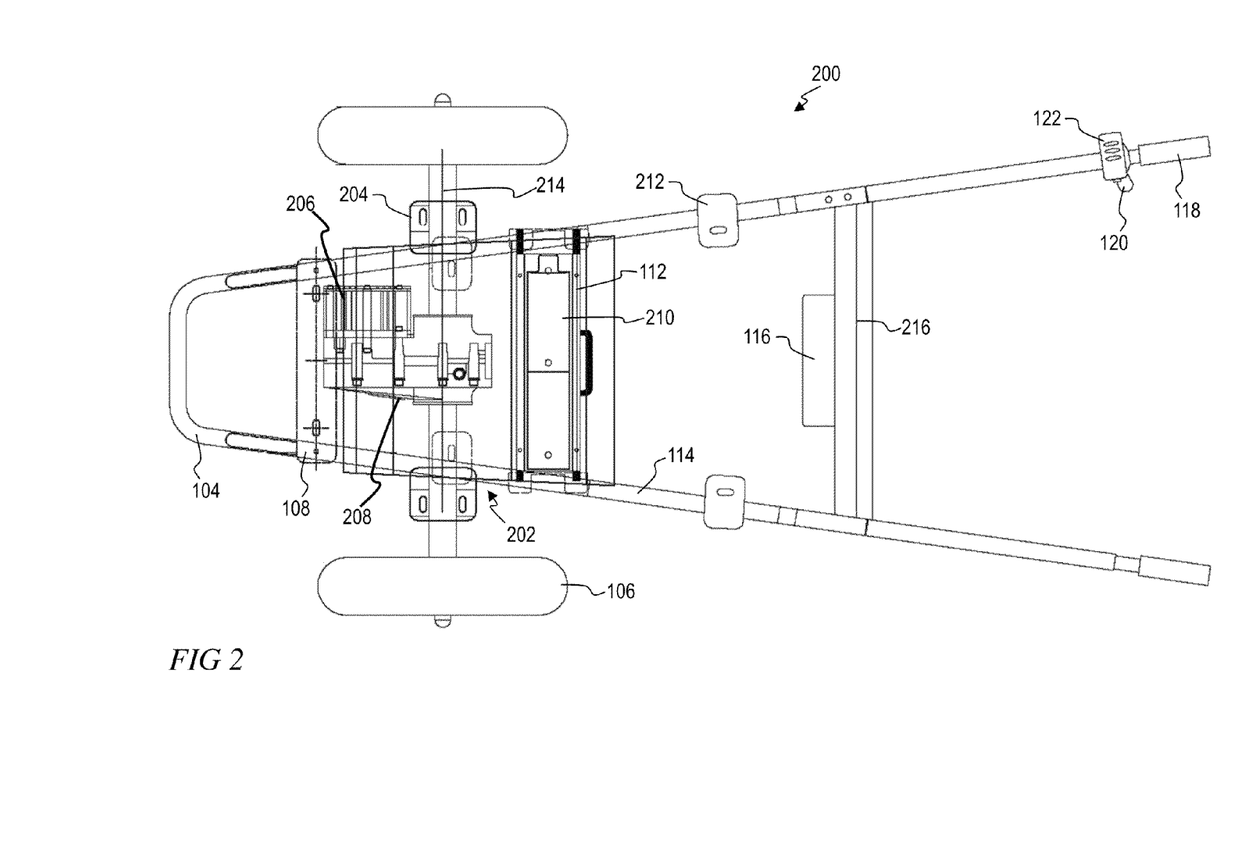
FIG. 2 is a top schematic view of a power assist wheelbarrow, according to some embodiments.

Referring to FIG. 2, a top schematic view 200 of a power assisted wheelbarrow is shown (without the pan shown), according to some embodiments. Support plates 204, 212 are used for fastening or securing the pan 102 to the frame assembly 114. A cross-brace support 216 secures the handle 118, but also supports at least a portion of the electrical control assembly 116. A power supply shroud 210 protects the power supply 112 and also provides cross-bracing support to the frame 114. In some embodiments the power supply shroud 210 is substantially waterproof. The electrical motor assembly 202, 208 includes a motor 206 and drive system 208 in contact with the axel 214. Electric motor assembly 202 may be positioned such that its total weight is centered on the axel 214, or positioned forward of the axel 214. In some embodiments, a separate drive system is provided for each wheel.

An electrical control assembly 116, 122 is positioned in proximity to handles 118 and includes a control switch 120 to control speed and direction and on/off functions. The control switch 120 allows for selection of multiple forward speeds, reverse direction and on/off, for example. The electrical control assembly 116, 122 can include a rheostat speed controller mounted to a proximal end of the handle assembly and a wiring harness electrically coupled to rheostat speed controller. The electrical control assembly further includes an operating switch electrically coupled to the rheostat speed controller and the wiring harness, a fuse electrically coupled to the rheostat speed controller and the operating switch, and a control box. In embodiments comprising separate drive systems for each wheel, the electrical control assembly can control each wheel independently cooperatively, and individually or simultaneously.

A wheel assembly 106 including an axel 214 positioned transversely between two wheels is partially shown. The wheel assembly 106 optionally includes a braking system. The electrical motor assembly 206, 208 is positioned in contact with the axel 214 and in electrical contact with the electrical control assembly 116, 122 and a power supply 112 supported by the frame assembly 114 in electrical contact with the electrical control assembly and electrical motor assembly. The motor assembly 206, 208 is substantially positioned between the wheels. The power supply 112 is positioned near the motor assembly 206, 208, but in a rear position. The weight of the power supply 112 should be positioned close enough to the axel 214 reduce the lifting weight.

The power supply 112 includes one or more primary or secondary batteries electrically coupled or in electrical contact with the electrical control assembly 116, 122 and electrical motor assembly 206 208. An optional battery charger can be electrically coupled to the batteries and disposed within the shroud 210. An optional battery meter electrically coupled to the fuse for indicating a quantity of power remaining in the batteries, and an optional power plug electrically coupled to the battery charger and selectively mated to an external power supply source can be included in the power supply 112.

The battery can comprise a single battery or can comprise a pair of batteries or a plurality of batteries coupled by circuitry in parallel or in series to deliver the proper voltage and power. The batteries can be wired in series to provide 12 or 24 volts direct current, for example. A sealed maintenance free rechargeable direct current twelve volt battery can be utilized in various embodiments of the inventive power barrow. Alternately, a rechargeable 24 volt 10 amp hour nickel cadmium battery could also be utilized in various embodiments.

Figure 3A:
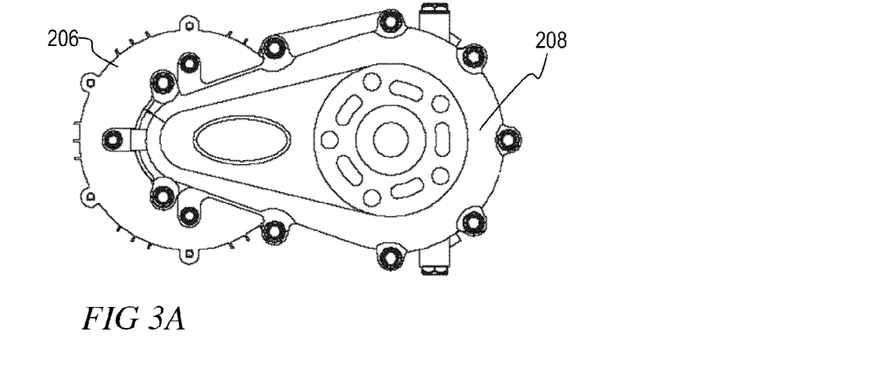
FIGS. 3A-C are schematic views of an electrical motor assembly, according to some embodiments.
Figure 3B:
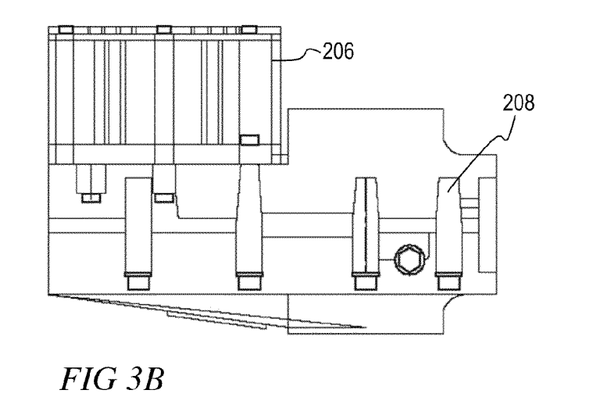
Figure 3C:
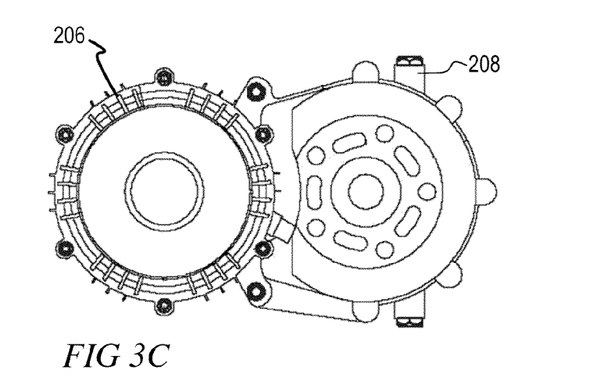
Figure 4:
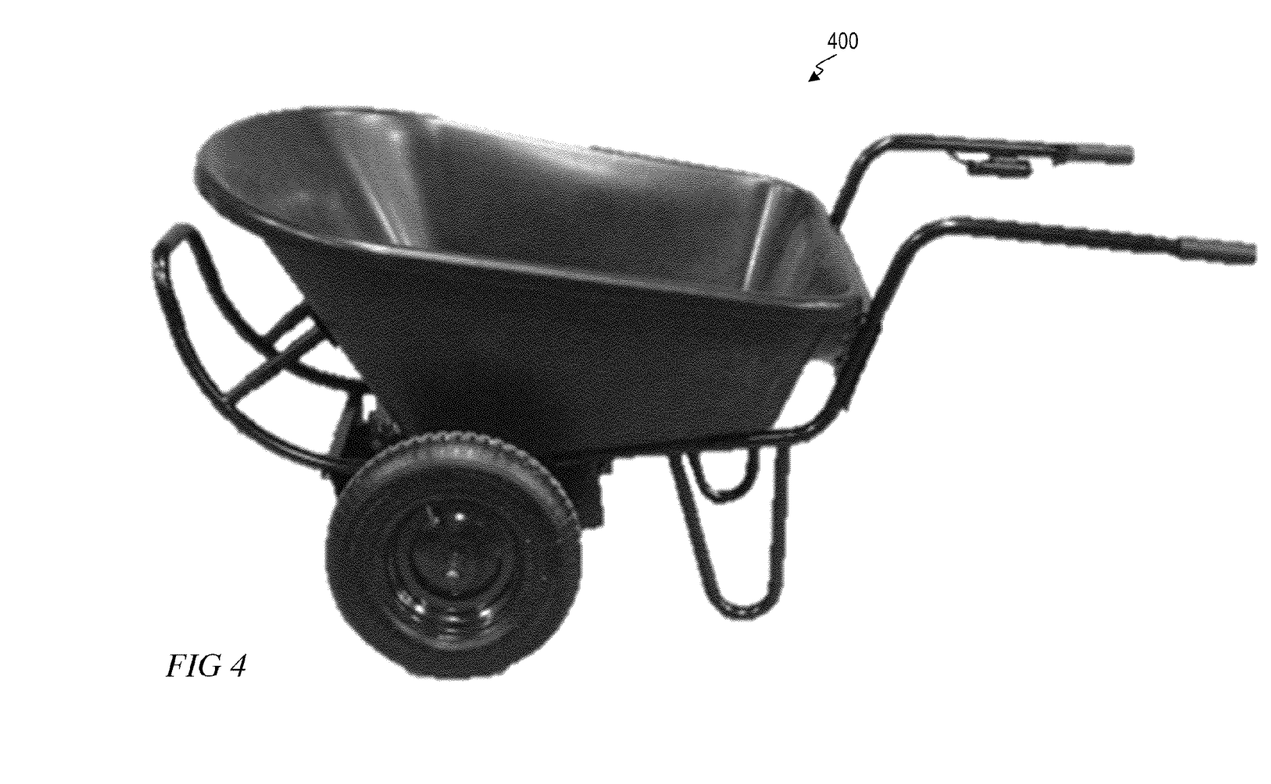
FIG. 4 is a perspective view of a power assist wheelbarrow, according to some embodiments.

The electrical motor assembly 206, 208 (see view 300 of FIGS. 3A-C) can include a drive system 208 which engages the electric motor 206. The drive system 208 can include a drive gear, a drive pulley, a drive sprocket which upon rotation generates rotation in a driven element such as a driven gear, a driven pulley or driven sprocket by way of a circumferentially continuous drive element such as a belt or link chain. The electric drive motor 206 can be rechargeable, and may be direct current or alternating current. FIG. 4 shows a further perspective view of an embodiment 400 of the present invention.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed is:

1. A power assisted wheelbarrow, comprising:
    a dumping pan;
    a frame assembly in contact with the dumping pan, the frame assembly including:
        handles;
        a dump brace;
        one or more dumping pan supports; and
        a resting support;
    an electrical control assembly positioned in proximity to the handles;
    a wheel assembly including an axle positioned transversely between two wheels;
    an electrical motor assembly positioned in contact with the axle and in electrical contact with the electrical control assembly, the electrical motor positioned forward of the axle;
    a power supply supported by the frame assembly in electrical contact with the electrical control assembly and electrical motor assembly;
    wherein the dump brace includes a curvature of about ninety degrees such that when a user dumps the contents of the dumping pan, the dump brace rolls into contact with the ground and prevents the dumping pan from contacting the ground, and wherein the electrical motor is located proximate to a pivot point defined between the dump brace and ground to reduce force required to tilt the wheelbarrow.

2. The power assisted wheelbarrow of claim 1, wherein the dumping pan comprises a plastic.

3. The power assisted wheelbarrow of claim 1, wherein the framing assembly comprises aluminum.

4. The power assisted wheelbarrow of claim 1, wherein the electrical control assembly further comprises a control switch.

5. The power assisted wheelbarrow of claim 4, wherein the control switch controls a forward speed, reverse and on/off.

6. The power assisted wheelbarrow of claim 1, wherein the power supply comprises two or more batteries.

7. The power assisted wheelbarrow of claim 1, wherein the power supply comprises primary batteries.

8. The power assisted wheelbarrow of claim 1, wherein the power supply comprises secondary batteries.

9. The power assisted wheelbarrow of claim 1, wherein the power supply comprises a 12 volt direct current battery.

10. The power assisted wheelbarrow of claim 1, wherein the power supply comprises a 24 volt direct current battery.

11. The wheelbarrow of claim 1, wherein the dump brace includes first and second members having ends proximate to and connected to the frame assembly and distal ends connected to one another to form a U-shape, wherein the distal end of the dump brace is not in contact with the front lip of the dumping pan.

12. The wheelbarrow of claim 11, wherein the one or more dumping pan supports extends from a point between proximate and distal ends of the first and second members and the dumping pan.

13. The wheelbarrow of claim 1, wherein the curvature of the dump brace is non-constant.

14. The wheelbarrow of claim 13, wherein the curvature of the dump brace has an increasing radius at a distal end furthest from the axle.

15. A wheelbarrow, comprising:
   a dumping pan;
   a frame assembly in contact with the dumping pan, the frame assembly including:
      handles;
      a dump brace including first and second members having ends proximate to and connected to the frame assembly and distal ends connected to one another to form a U-shape, wherein the distal end of the dump brace is located close to but not in contact with a front lip of the dumping pan;
      one or more dumping pan supports, wherein the one or more dumping pan supports extend from a point between proximate and distal ends of the first and second members and the dumping pan; and
      a resting support;
   a wheel assembly including an axle positioned transversely between two wheels;
   wherein the dump brace includes a curvature of about ninety degrees such that when a user dumps the contents of the dumping pan, the dump brace rolls into contact with the ground and prevents the dumping pan from contacting the ground, and prevents force from being applied to the front lip of the dumping pan.

16. The wheelbarrow of claim 11, wherein the curvature of the dump brace is non-constant.

17. The wheelbarrow of claim 16, wherein the curvature of the dump brace has an increasing radius at a distal end furthest from the axle.

* * * * *